(12) United States Patent
Evans

(10) Patent No.: US 6,386,545 B1
(45) Date of Patent: May 14, 2002

(54) FLUID PLUG

(76) Inventor: Robert W. Evans, 10411 Twin Circles Dr., Montgomery, TX (US) 77356

( * ) Notice: Subject to any disclaimer, the term of this patent is extended or adjusted under 35 U.S.C. 154(b) by 0 days.

(21) Appl. No.: 09/312,993

(22) Filed: May 17, 1999

(51) Int. Cl.[7] .............................................. E21B 33/10
(52) U.S. Cl. ...................... 277/336; 277/616; 277/638; 277/641; 277/910; 73/152.26; 73/863.85; 73/323
(58) Field of Search ................................ 277/628, 309, 277/311, 342, 336, 602, 603, 616, 626, 323, 625, 630, 638, 637, 642, 910, 641; 73/152.26, 323, 863.85; 403/349

(56) References Cited

U.S. PATENT DOCUMENTS

| | | | |
|---|---|---|---|
| 3,687,465 A | * | 8/1972 | Grime et al. |
| 3,693,986 A | * | 9/1972 | Lambie |
| 3,933,358 A | * | 1/1976 | Hoer |
| 4,493,373 A | * | 1/1985 | Jackson ....................... 166/321 |
| 4,757,710 A | * | 7/1988 | Haynes ......................... 73/334 |
| 4,817,994 A | * | 4/1989 | Bronnert ....................... 285/93 |
| 4,990,312 A | * | 2/1991 | Rucker et al. ................. 422/78 |
| 5,035,266 A | * | 7/1991 | Benson et al. ................. 138/92 |
| 5,064,530 A | * | 11/1991 | Duff et al. .................... 210/94 |
| 5,075,951 A | * | 12/1991 | Schurr et al. ................. 29/428 |
| 5,103,648 A | * | 4/1992 | Barbier ........................ 62/126 |
| 5,210,658 A | * | 5/1993 | Foster ......................... 359/894 |
| 5,213,586 A | * | 5/1993 | Welker ......................... 48/195 |
| 5,232,060 A | * | 8/1993 | Evans .......................... 175/297 |
| 5,291,842 A | * | 3/1994 | Sallstrom et al. ............. 111/127 |
| 5,383,338 A | * | 1/1995 | Bowsky et al. ................ 62/125 |
| 5,490,680 A | * | 2/1996 | Patel et al. |
| 5,624,001 A | * | 4/1997 | Evans .......................... 175/299 |
| 6,045,166 A | * | 4/2000 | Krause ......................... 285/347 |
| 6,092,812 A | * | 7/2000 | Ursel et al. .................. 277/630 |

OTHER PUBLICATIONS

The Lee Company; *Lee Product Data Sheet*; all; Jul. 1997.
The Lee Company Technical Center; *Lee Technical Hydraulic Handbook*; pp. 12–48; 1989.

* cited by examiner

Primary Examiner—Anthony Knight
Assistant Examiner—Alison K. Pickard
(74) Attorney, Agent, or Firm—Timothy M. Honeycutt

(57) ABSTRACT

A plug is provided for sealing a port of a downhole tool or other device. In one aspect, the plug includes a disk that has an upper surface, a lower surface and an annular groove in the lower surface. The annular groove has an inner wall and a outer wall. An annular seal member is positioned in the annular groove. An annular member is positioned in the annular groove between the annular seal member and the and the outer wall to retain the annular seal member in the annular groove. A member is provided that has least one external thread for engaging the at least one internal thread of the port whereby rotation of the member in a given direction moves the disk toward and compresses the annular seal member against the bottom surface. The plug provides excellent fluid sealing capability with a short axial dimension suitable for small O.D. and thin-walled tools.

13 Claims, 3 Drawing Sheets

FLUID PLUG

BACKGROUND OF THE INVENTION

1. Field of the Invention

This invention relates generally to fluid chamber plugs, and more particularly to a plug for a fluid fill port of a downhole tool.

2. Description of the Related Art

Fluid filled devices, such as various types of downhole tools, frequently require one or more plugs to close off various ports formed in the devices. The primary purpose of such ports is to enable operators to move fluids into and out of the devices. For example, many conventional downhole tools utilize hydraulic fluid to manipulate internal components, such as pistons. The initial requisite volume of hydraulic fluid is introduced into the tool and later drained as necessary during maintenance via the fill port. In addition to fluid movement, fill ports are often used to provide access to components enclosed within the device or tool after the tool is assembled, such as electronic circuitry, sensors or other components.

Various types of plug designs have been used in the oil and gas and other types of industries. One conventional design incorporates a plug with a tapered exterior and a set of tapered threads which are designed to engage a corresponding set of tapered threads in a tapered bore hole in the tool housing. Fluid seal is dependent upon an interference fit between the mating sets of threads. This type of conventional plug design normally becomes less dependable with repeated use due to deformation and wear of the mating sets of threads. Furthermore, this conventional plug design will normally not mount flush with the exterior of the device or downhole tool into which it is inserted. A plug that projects outwardly from the exterior of the device or downhole tool may present a structure which can hang up on the interior surfaces of a wellbore, a coil tubing injector, or other types of internal bore structures. Furthermore, if the portion of the plug projecting from the device impacts other structures during operations, the plug may be damaged and its capability of maintaining a fluid seal degraded.

Another conventional design utilizes a conical shaped plug member that is connected to a threaded hex nut. The connection between the plug member and the hex nut is by way of a flange that is positioned inside the hex nut. The flange is connected to the plug member by a shaft that projects through an opening in one end of the hex nut. A fluid seal is established by plastic deformation of the edges of the port thru-hole by the conical surface of the plug member. The difficulty with this design is the reliance upon plastic deformation of the port structure in order to establish a fluid seal as well as the sheer length of the plug.

Another conventional design incorporates a mandrel which has a threaded section and a smooth section which is fitted with an external O-ring. The O-ring is often positioned on a turned-down outer diameter ("O.D.") portion of the smooth section, and is designed to seal against the inner diameter of a fluid port. High manufacturing cost and complexity are disadvantages associated with this design. In addition, this type of plug may not successfully seal against extremely high pressures and is prone to O-ring extrusion due to the action of high pressure fluid.

Excessive plug length is a disadvantage shared by many conventional designs. Modern downhole tools, particularly those used in coiled tubing applications, frequently have O.D.'s of less than three inches. In tools with such small O.D.'s, the successful scaling of the thickness of the tool housing wall is necessary to accommodate the required internal structures for the tool. Conventional plug designs represent a limitation on the potential scaling of tool wall thickness. In many cases, conventional plugs require a greater wall thickness than is required to resist the working stresses applied to the tool. Accordingly, the tool must either be fabricated with a larger than necessary O.D., or sacrifices in the design of the internal structures of the tool must be made in order to accommodate the wall thickness required by the conventional plug design.

The present invention is directed to overcoming or reducing the effects of one or more of the foregoing disadvantages.

SUMMARY OF THE INVENTION

In accordance with one aspect of the present invention, a plug for a housing port that has at least one internal thread and a bottom surface is provided. The plug includes a disk that has an upper surface, a lower surface and an annular groove in the lower surface. The annular groove has an inner wall and a outer wall. An annular seal member is positioned in the annular groove. An annular member is positioned in the annular groove between the annular seal member and the outer wall to retain the annular seal member in the annular groove. A member is provided that has least one external thread for engaging the at least one internal thread of the port whereby rotation of the member in a given direction moves the disk toward and compresses the annular seal member against the bottom surface.

In accordance with another aspect of the present invention, a plug for a housing port that has a bottom surface is provided. The plug includes a disk that has an upper surface, a lower surface and an annular groove in the lower surface. The annular groove has an inner wall and a outer wall. An annular seal member is positioned in the annular groove. An annular member is positioned in the annular groove between the annular seal member and the outer wall to retain the annular seal member in the annular groove. A member is positioned in the port. Means are provided for translating torque applied to the member in a given direction into axial movement of the member toward the bottom surface to move the disk toward and compress the annular seal member against the bottom surface.

In accordance with another aspect of the present invention, a downhole tool is provided. The downhole tool includes a housing that has an internal chamber, a port that has a first portion with at least one internal thread and a second portion that is in communication with the internal chamber and has a reduced diameter portion defining an annular surface. A plug is positioned in the port and has a disk with an upper surface, a lower surface and an annular groove in the lower surface. The annular groove has an inner wall and an outer wall. An elastomeric annular member is positioned in the annular groove. An annular member is positioned in the annular groove between the elastomeric annular member and the outer wall to retain the elastomeric annular member in the annular groove. A member is provided that has at least one external thread for engaging the at least one internal thread of the port whereby rotation of the member in a given direction moves the disk toward and compresses the elastomeric annular member against the annular surface.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
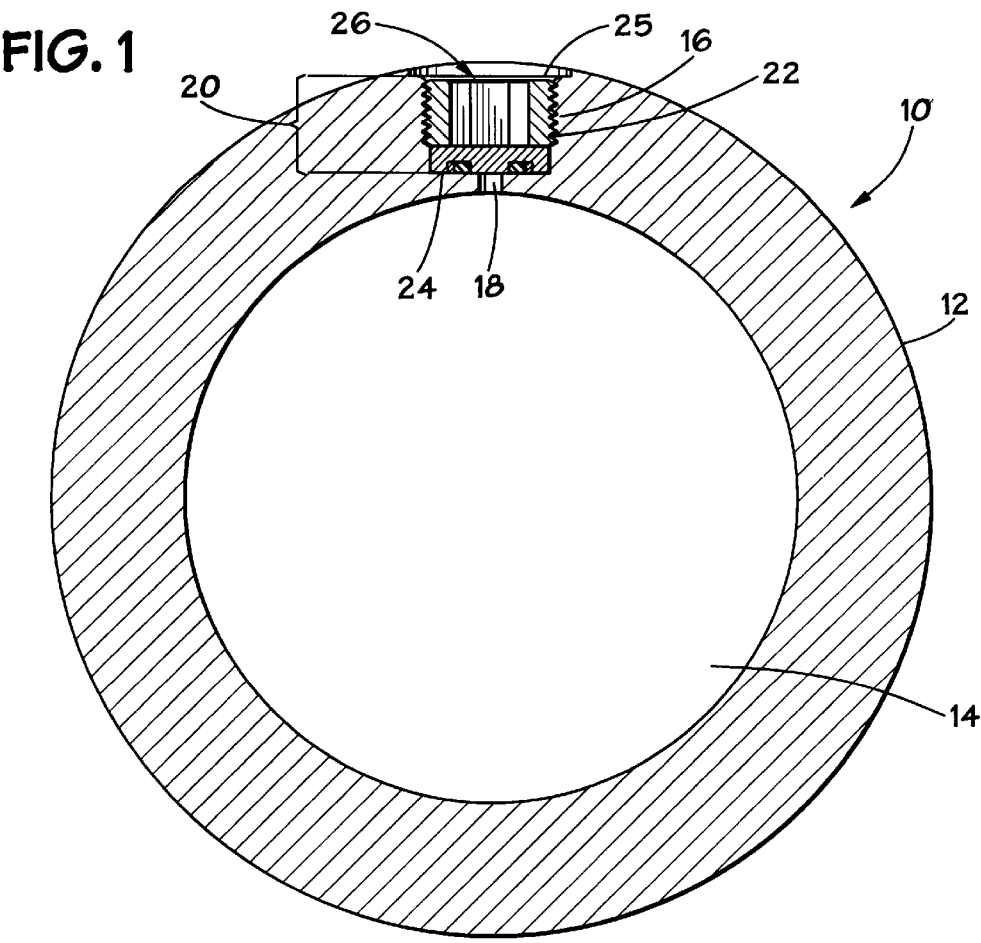
FIG. 1 is a full sectional view of an exemplary embodiment of a downhole tool and fill port plug in accordance with the present invention.

In the drawings described below, reference numerals are generally repeated where identical elements appear in more than one figure. Turning now to the drawings, and in particular to FIG. 1, there is shown a cross-sectional view of an exemplary embodiment of a downhole tool 10 that includes generally tubular housing 12 which encloses an internal chamber 14. Access to the internal chamber 14 for the purpose of moving a fluid into or out of the internal chamber 14 or for accessing structures within the chamber 14 is by way of a port 16 in the tool housing 12. The downhole tool 10 may be any of a great variety of different types of downhole tools wherein external access to an internal chamber is desired, such as, for example, drilling jars, accelerators, and packers to name just a few. The fill port 16 consists of a first portion or thru-hole 18 that is in fluid communication with the internal chambers 14 and a second portion 20 that has a larger diameter than the first portion 18 and is internally threaded at 22. The transition from the first portion 18 to the second portion 20 defines an upwardly bottom annular surface 24. A flat 25 may be formed in the exterior of the housing at the upper end of the port 16.

The port 16 is sealingly closed by a plug 26. The detailed structure of the plug 26 may be understood by referring now also to FIG. 2, which is a magnified sectional view of a selected portion of FIG. 1, and to FIG. 3, which is an exploded pictorial view of the plug 26. The plug 26 includes a disk 28 that has an upper surface 30 and a lower surface 32. An annular groove 34 is formed in the lower surface 32 with an inner wall 36 and an outer wall 38. The disk 28 is positioned in the port 16 so that the central portion of the disk 40 is positioned over the thru-hole 18. The bottom 42 of the annular groove 34 is advantageously substantially flat so that the disk 28 may seat uniformly thereon. The disk 28 is directly exposed to fluid contained in the internal chamber 14. Accordingly, the disk 28 is advantageously composed of corrosion resistant materials, such as, for example, stainless steel, aluminum bronze, manganese bronze or the like.

An annular seal member 44 is positioned in the annular groove 34 and retained therein by an annular member 46 that is positioned in the annular groove 34 between the elastomeric annular member 44 and the outer wall 38 of the annular groove 34. The annular seal member 44 is designed to provide a compliant seal with the bottom surface 24 of the port 16 to seal the thru-hole 18. Accordingly, the annular seal member 44 may be an elastomeric annular member, such as, for example, an O-ring, and may be composed of commonly used seal materials, such as, for example, Viton, various well known rubbers or the like. Alternatively, the annular seal member 44 may be composed of a compliant metallic material, such as, for example, lead, lead alloys or the like.

The annular member 46 is designed to retain the annular seal member 44 in the groove 34. This is desirable in order to reduce the possibility that the annular seal member 44 falls out of the disk 28 during assembly and handling and ensures that the annular seal member 44 is not extruded from the groove 34 by fluid pressure following installation. As the skilled artisan will appreciate, O-ring extrusion due to fluid pressure is a common seal failure mechanism in various types of conventional fluid port plugs. To aid in retaining the annular seal member 44 in the groove 34, the annular member 46 may be provided with a concave inner surface 48. The annular member 46 is, itself, retained in the annular groove 34 by providing the outer wall 38 of the annular groove 34 with a radially inward taper from the groove bottom 42 to the groove top 50. The annular member 46 is provided with a tapered outer wall 52 that generally matches the taper of the outer wall 38 of the groove 34 so that the annular member 46 may be snapped into position within the groove 34. This interaction between the tapered walls 38 and 52 retains the annular member in the groove 34. In addition, the annular member 46 and the groove 34 may be dimensioned to establish an interference fit. The annular member 46 is advantageously composed of a corrosion resistant material with some compliance so that it may be readily snapped into position within the groove 34. A variety of materials may be suitable, such as, for example, Teflon®, stiff rubber materials, or the like.

The disk 28, and thus the annular seal member 44, are compressed against the bottom surface 24 of the port 16 by a member or screw 54 that is externally threaded at 56. The member 54 is provided with an internal opening 58 that may be a hex as shown or some other type of opening suitable for receiving a tool (not shown) for applying torque to the member 54. The number and configuration of the threads 56 as well as the cooperating threads 22 in the port 16 are largely matters of design discretion. In an exemplary embodiment, American National Standard Unified Screw threads are employed. When tightened down, the member 54 is flush with or positioned below the flat 25 so that no structure protrudes from the housing 12 which might otherwise hang up on other structures encountered by the tool 10.

The member 54 is designed to absorb significant amounts of torque that may be applied thereto to ensure a snug fluid-tight seal by the disk 28. Accordingly, the member is advantageously composed of high strength materials, such as, for example, alloy steels, such as 4140 or 4340 steels, mild carbon steels or the like.

Figure 2:
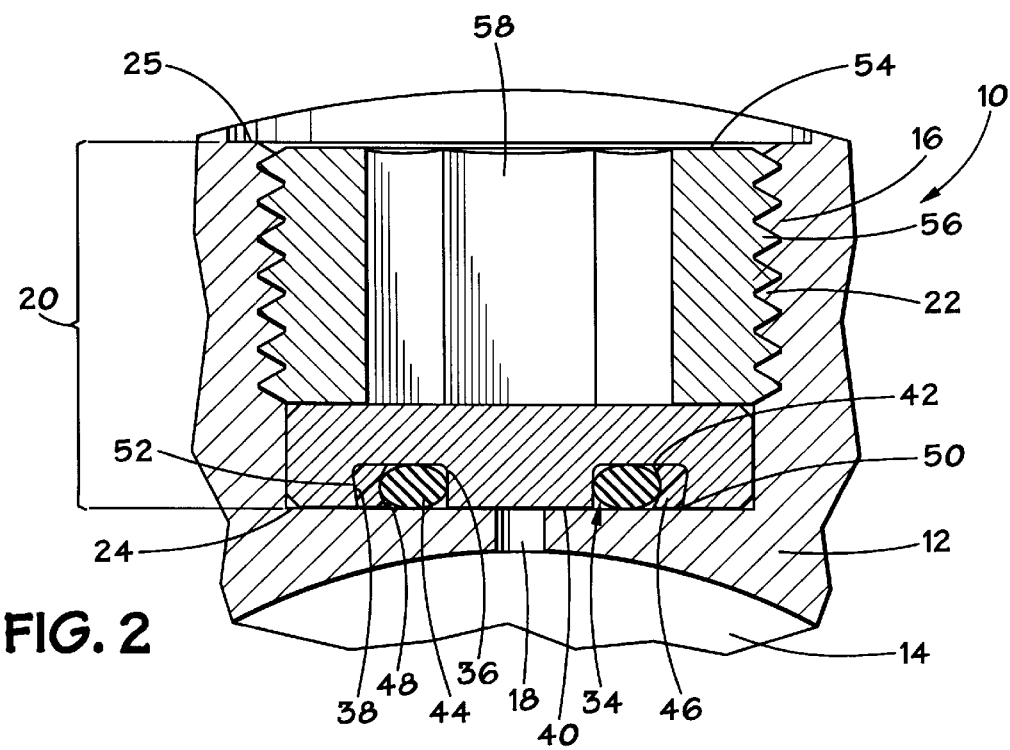
FIG. 2 is a magnified sectional view of the plug depicted in FIG. 1.
Figure 3:
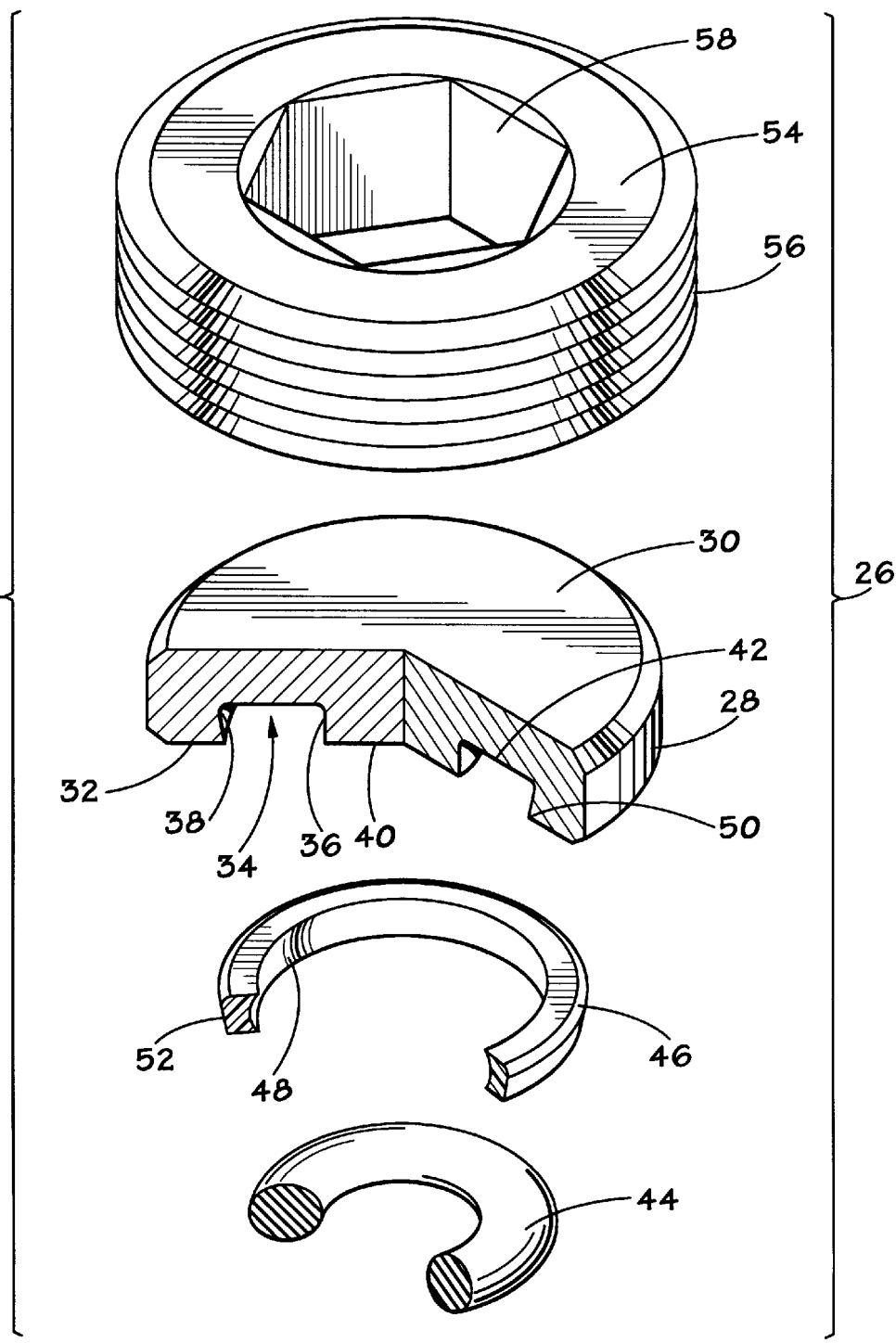
FIG. 3 is an exploded pictorial view of the plug depicted in FIG. 2.

The assembly of the plug 26 may be understood by referring to FIGS. 2 and 3. Initially, the annular seal member 44 and the annular member 46 are snapped into position in the annular groove 34 of the disk 28. The disk 28 is then inserted into the port 16 and seated on the bottom surface 24. The member 54 is then threaded into the threaded portion 20 of the port 16 and tightened down to compress the annular seal member 44 against the bottom surface 24 to establish a fluid tight seal of the through port 18. An excellent seal against the bottom surface 24 is established by the annular seal member 44, and unwanted extrusion thereof due to fluid pressure is prevented by the annular member 46. Removal of the plug 26 entails a simple reversal of the aforementioned procedure. The member 54 is unscrewed from the threaded section 20 and the disk 28 is pulled from the port 16.

Figure 4:
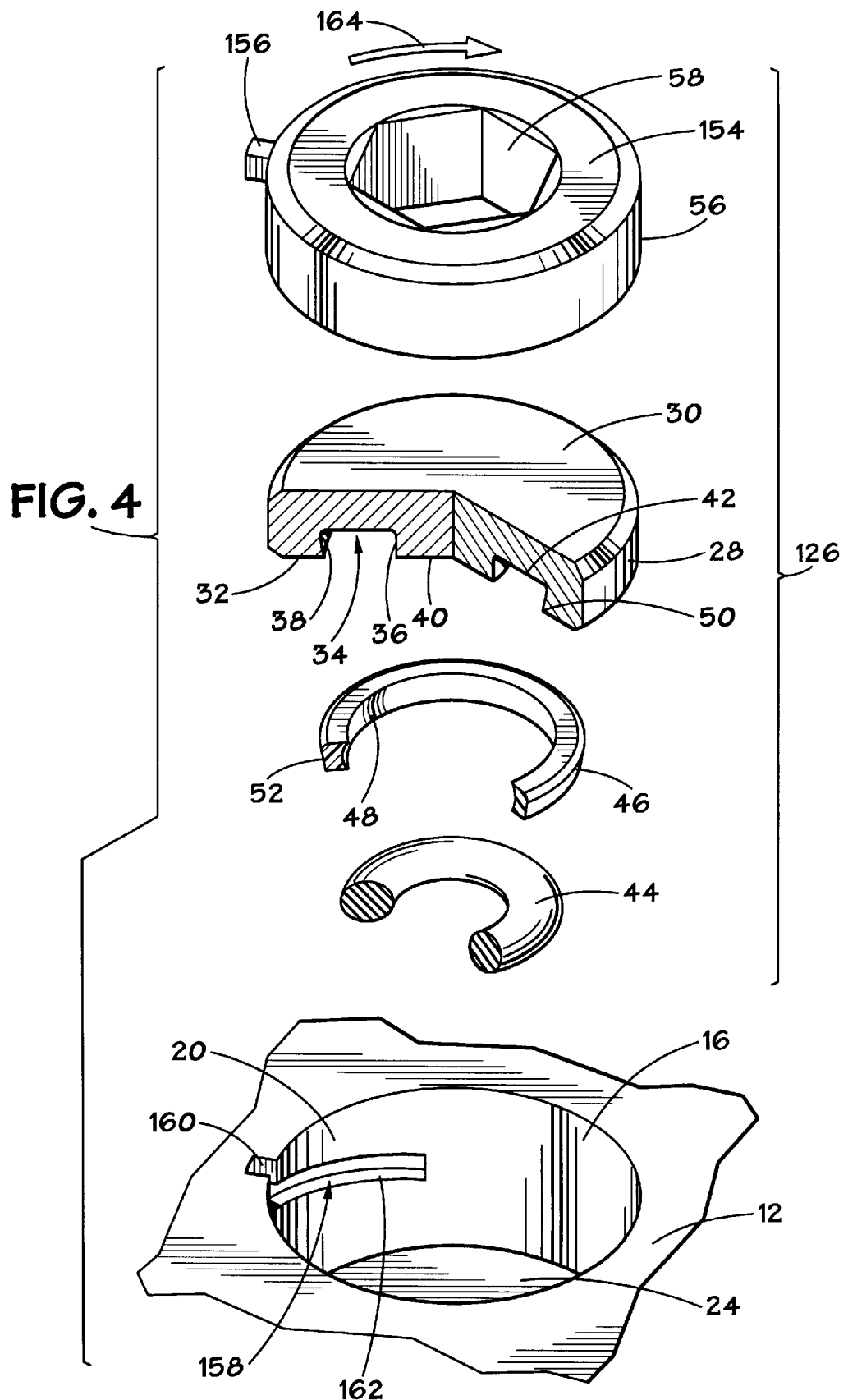
FIG. 4 is an exploded pictorial view of an alternate exemplary embodiment of the fluid plug in accordance with the present invention.

An alternate exemplary embodiment of the plug, now designated 126, may be understood by referring now to FIG. 4, which is an exploded pictorial view similar to FIG. 3. In this illustrative embodiment, the member, now designated 154, is provided with an external key 156 in lieu of the external threads illustrated for the above-described exemplary embodiment. The key 156 is designed to engage a downwardly sloping slot 158 formed in the portion 20 of the port 16. The slot 158 has a vertical opening 160 and a downwardly sloping portion 162 that follows the inner diameter of the portion 20 of the port 16. The plug 126 is assembled as generally described above. However, after the disk 28 is inserted into the port 16, the member 154 is dropped into the port 16 so that the key 156 slides through the vertical portion 160 of the slot 158. At this point, the member 154 is rotated in a given direction, in this case, clockwise as indicated by the arrow 164. The interaction of the key 156 with the slot 158 translates torque applied to the member 154 into downward axial movement of the member 154, and thus, the required compression of the disk 28 and the annular seal member 44 against the bottom portion 24 of the port 16. The embodiment illustrated in FIG. 4 provides a quick connect and disconnect capability for the plug 126 that may be particularly suitable for low pressure applications.

The skilled artisan will appreciate that the fluid plug 26 or 126 in accordance present invention provides excellent fluid sealing capability without requiring excessive tool housing wall thickness. The incorporation of a relatively thin flat disk 28 with a torque member or screw 54 that is not physically connected to the disk 28 significantly reduces the axial length of the plug 26 over what is found in conventional fluid port plugs.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A plug for a housing port that has at least one internal thread and a bottom surface, comprising:

a disk having an upper surface, a lower surface and an annular groove in the lower surface, the annular groove having an inner wall, a first outer wall, a top and a bottom, the first outer wall of tie annular groove being tapered radially inwardly from the bottom to the top of the annular groove;

an annular seal member positioned in the annular groove;

an annular member positioned in the annular groove between the annular seal member and the outer wall and having second outer wall, the second outer wall being radially inwardly tapered to establish wedging engagement with the first outer wall of the annular groove whereby the annular member is retained in the annular grove; and a member having at least one external thread for engaging the at least one internal thread of the port whereby rotation of the member in a given direction moves the disk toward and compresses the annular seal member against the bottom surface.

2. The plug of claim 1, wherein the annular seal member comprises an elastomeric annular member.

3. The plug of claim 2, wherein the elastomeric annular member comprises an O-ring.

4. The plug of claim 1, wherein the annular member has a concave inner surface for engaging the annular seal member.

5. The plug of claim 1, wherein the member comprises a screw.

6. A plug for a housing port that has a bottom surface, comprising:

a disk having an upper surface, a lower surface and an annular groove in the lower surface, the annular groove having an inner wall, a first outer wall, a top and a bottom, the first outer wall of the annular groove being tapered radially inwardly from the bottom to the top of the annular groove;

an annular seal member positioned in the annular groove;

an annular member positioned in the annular groove between the annular seal member and the first outer wall and having a second outer wall, the second outer wall being radially inwardly tapered to establish wedging engagement with the first outer wall of the annular groove whereby the annular member is retained in the annular groove; and a member positioned in the port and having a radially outwardly projecting key to engage a downwardly sloping slot in the port whereby torque applied to the member in a given direction is translated into axial movement of the member toward the bottom surface to move the disk toward and compress the annular seal member against the bottom surface.

7. The plug of claim 6, wherein the annular seal member comprises an elastomeric annular member.

8. The plug of claim 7, wherein the elastomeric annular member comprises an O-ring.

9. The plug of claim 6, wherein the annular member has a concave inner surface for engaging the annular seal member.

10. A downhole tool, comprising:

a housing having an internal chamber, a port having a first portion with at least one internal thread and a second portion in communication with the internal chamber and having a reduced diameter portion defining an annular surface; and a plug positioned in the port and having a disk with an upper surface, a lower surface and an annular groove in the lower surface, the annular groove having an inner wall, a first outer wall, a top and a bottom, the first outer wall of the annular groove being tapered radially inwardly from the bottom to the top of the annular groove, an elastomeric annular member positioned in the annular groove, an annular member positioned in the annular groove between the elastomeric annular member and the first outer wall and having second outer wall, the second outer wall being radially inwardly tapered to establish wedging engagement with the first outer wall of the annular groove whereby the annular member is retained in the annular groove, and a member having at least one external thread for engaging the at least one internal thread of the port whereby rotation of the member in a given direction moves the disk toward and compresses the elastomeric annular member against the annular surface.

11. The downhole tool of claim 10, wherein the elastomeric annular member comprises an O-ring.

12. The downhole tool of claim 10, wherein the annular member has a concave inner surface for engaging the elastomeric annular member.

13. The downhole tool of claim 10, wherein the member comprises a screw.

* * * * *

UNITED STATES PATENT AND TRADEMARK OFFICE
CERTIFICATE OF CORRECTION

PATENT NO. : 6,386,545 B1
DATED : May 14, 2002
INVENTOR(S) : Robert W. Evans

It is certified that error appears in the above-identified patent and that said Letters Patent is hereby corrected as shown below:

Column 5,
Line 43, please replace "tie" with -- the --.
Line 48, please insert the word -- first -- before "outer wall".

Signed and Sealed this

Sixth Day of May, 2003

JAMES E. ROGAN
*Director of the United States Patent and Trademark Office*